Dec. 6, 1955　　　　　　E. WILDHABER　　　　　2,725,792
MACHINE FOR GENERATING TAPERED GEARS
Filed Oct. 29, 1952　　　　　　　　　　　　　3 Sheets-Sheet 1

INVENTOR.
ERNEST WILDHABER
BY
Richard W. Treverton
ATTORNEY

Dec. 6, 1955　　　　　E. WILDHABER　　　　2,725,792
MACHINE FOR GENERATING TAPERED GEARS
Filed Oct. 29, 1952　　　　　　　　　　　3 Sheets-Sheet 2

*INVENTOR.*
ERNEST WILDHABER
BY
Richard W. Treverton
*ATTORNEY*

Dec. 6, 1955  E. WILDHABER  2,725,792

MACHINE FOR GENERATING TAPERED GEARS

Filed Oct. 29, 1952  3 Sheets-Sheet 3

INVENTOR.
ERNEST WILDHABER
BY Richard W. Treverton
ATTORNEY

United States Patent Office 2,725,792
Patented Dec. 6, 1955

2,725,792

MACHINE FOR GENERATING TAPERED GEARS

Ernest Wildhaber, Brighton, N. Y., assignor to The Gleason Works, Rochester, N. Y., a corporation of New York Application October 29, 1952, Serial No. 317,435

7 Claims. (Cl. 90—5)

The present invention relates to a machine for generating spiral bevel and hypoid gears having tapered tooth spaces.

The machine includes a work support and a tool support, one of which is mounted on a rotatable cradle. A rotary cutter is mounted on the tool support and a work spindle is journaled in the work support. A generating train connects the spindle to the cradle so that they rotate in properly timed relationship to generate the tooth profiles of the gear being cut. A reversible drive is connected to the generating train for driving it alternately in opposite directions. One side of a tooth is generated during rotation of the cradle and work spindle in one direction and the other side of the tooth during rotation of them in the opposite direction. The reversible drive preferably comprises a rotary cam and a means to drive it always in one direction, this arrangement being as disclosed in the copending application of Arthur L. Stewart and Leonard O. Carlsen, Serial No. 779,890, filed October 15, 1947, now Patent No. 2,667,818, issued February 2, 1954. Change gears arranged between the reversible drive means and the generating train enable the amplitude of the cradle and work spindle rotations to be varied.

In order to cut tapered tooth spaces the work spindle is rotated at a different ratio to the motion of the generating train drive during generation of one tooth side than during generation of the opposite tooth side. When producing spiral teeth the cutting progresses from one end of a tooth to the other as the generating rotation of the cradle and work spindle progresses, and for producing the concave side of the tooth there is a slower rotation of the work spindle, relative to the rate of cradle rotation, than for producing the convex side of the tooth. In this way the spiral angle of the concave side is smaller, and that of the convex side is greater, than if both sides were produced with the same ratio between cradle and work spindle rotations. Thus tooth spaces having the desired degree of taper are produced.

According to the present invention this change in ratio is effected by an additional component of motion introduced through a differential mechanism that is disposed in the generating train at a point between the work spindle and the reversible drive for the train. The added motion is produced by a ratio-varying cam which preferably rotates as a unit with the cam which actuates the generating train, thereby assuring proper timing. The additional motion provided is in effect subtracted from motion of the generating train drive cam as applied to the work spindle during generation of the concave tooth side, and is added during generation of the convex side.

The amount of the added (or subtracted) motion may be readily varied by substituting change gears which are arranged between the additional motion cam and the differential. In this way the tooth space taper can readily be varied within a wide range although the same ratio-varying cam is employed. One or more substitute cams may be provided for exceptional cases falling beyond the normal range.

The ratio-varying cam is so formed as to provide angular set-over of the work between the two generating operations in which the respective tooth sides are cut, this set-over occurring when the cutter is adjacent the large end of the tapered tooth space. With the arrangement described this set-over motion affects only the relatively light work spindle and the portion of the generating train adjacent to it, there being no such motion of the relatively heavy cradle. The ratio-varying cam is also formed to provide a dwell between the two generating operations when the cutter is adjacent the small end of the tooth space. During this dwell there is no motion of the cradle, and the work spindle is indexed to bring a successive tooth space of the work gear into cutting position. Such indexing of the spindle is effected by motion that is preferably introduced through another differential mechanism in the generating train.

The foregoing and other objects and advantages of the invention will appear from the following description made with reference to the drawings, in which.

Figure 1:
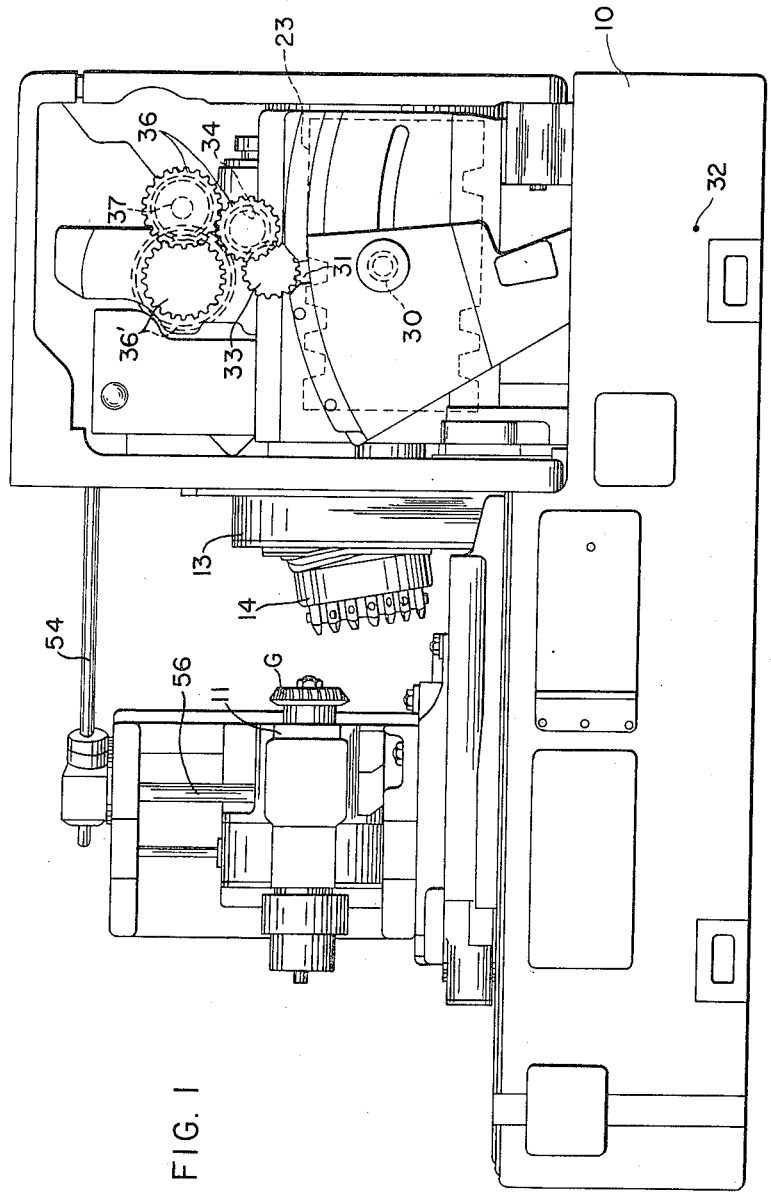
Fig. 1 is a side elevational view of a machine embodying the invention.
Figure 2:
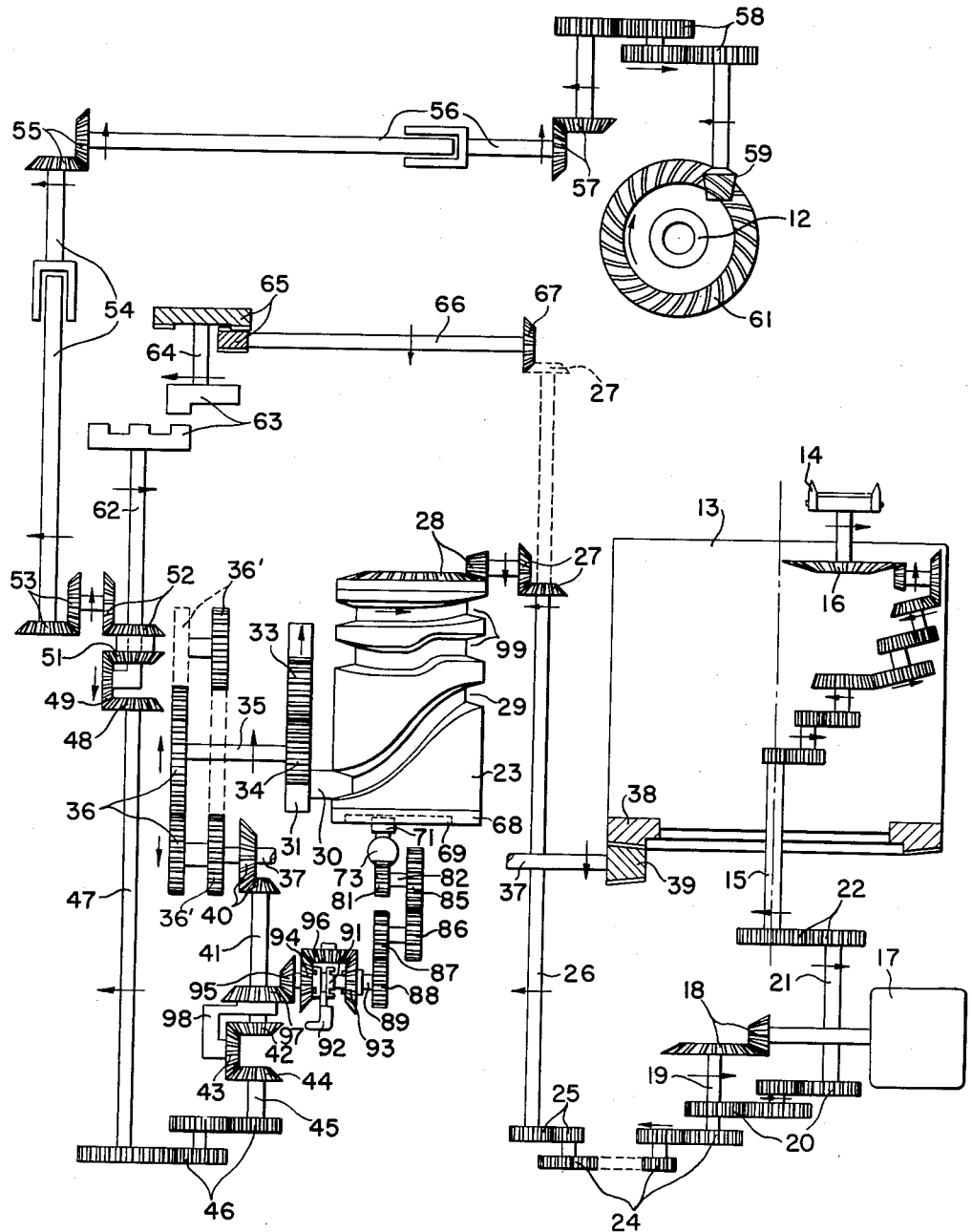
Fig. 2 is a drive diagram of the machine.

In Figs. 1 and 2 the invention is shown as applied to a machine for rough cutting, close to finished size, gears that are to be finished in a finish cutting or grinding machine. The machine has a frame 10 on which is mounted a work support 11 journaling a work spindle 12 that carries the work gear or gear blank G. Mounted for rotation on the frame about a horizontal axis is a cradle 13 having a tool supporting part in which is journaled a spindle for rotary face mill cutter 14. This tool supporting part is adjustable on the cradle to set the spindle in the desired position relative to the cradle axis. Hence the drive for the spindle is through a number of spur and bevel gears which connect a shaft 15, that is coaxial with the cradle, with a bevel gear 16 on the cutter spindle. The details of the cradle construction which enables the adjustments referred to are disclosed in the aforementioned application Serial No. 779,890.

The drive for the cutter, and also for the cradle 13 and the work spindle 12 is from an electric motor 17, which through bevel gears 18 drives a shaft 19. The cutter drive shaft 15 is driven from shaft 19 through change gears 20, shaft 21 and gears 22.

The drive for the cradle and work spindle is through a rotary drum-shaped cam 23. The drive for this cam from shaft 19 is through change gears 24 whose ratio determines the speed of the generating cycle, gears 25, shaft 26, and bevel gear pairs 27 and 28. The cam has a continuous track 29 in which is disposed a follower roller 30 that is carried by a gear segment 31 which is oscillated on the frame about axis 32 (Fig. 1). The gear segment meshes with a pinion 33 which acts through gear 34, shaft 35, and change gears 36 to drive a main shaft 37 of the generating train. The cam 23 always rotates in the same direction and its cam track 29 is preferably formed to provide for a more rapid motion of segment 31 in one direction than the other. However, by insertion of an additional idler in the change gears, as indicated by the dotted line gear 36' in Fig. 2, and removal of the outer gear 36 on shaft 37, the directions of the latter shaft during which its motions are respectively rapid and slow can be reversed. The drive is then from gear 36 on shaft 35, to the dotted line gear 36', and thence through full line gears 36' to shaft 37.

On the cradle is a ring gear 38 which is driven from shaft 37 by a pinion 39. The drive for the work spindle 12 from shaft 37 is through bevel gears 40, shaft 41, gears 42, 43 and 44 of the differential unit through which the ratio-varying motion is applied, shaft 45, ratio-of-roll change gears 46, shaft 47, index differential gears 48, 49 and 51, bevel gear pairs 52 and 53, telescoping shaft 54, bevel gears 55, telescoping shaft 56, bevel gears 57, index change gears 58, and hypoid pinion 59 and gear 61.

The planet gear 49 of the index differential is carried by a shaft 62 on which gear 51 is rotatable and on which is mounted the driven member of an indexing device 63. The drive member of the latter is mounted on a shaft 64 driven by hypoid gears 65 from a shaft 66 which in turn is driven by a bevel gear 67 that meshes with the bevel gear 27 on shaft 26. For further details as to the construction and arrangement of the parts here designated 47 to 67 reference may be made to aforementioned application Serial No. 779,890. It need only be mentioned here that upon the completion of each revolution of cam 23, which means upon the completion of cutting one tooth space of the work gear G, the device 63 rotates shaft 62 through a predetermined angle such that the work gear G is advanced by one or more teeth so that a new tooth space is brought into cutting position. At all other times the shaft 62 is locked against movement so that gear 49 can rotate only about its own axis.

Figure 4:
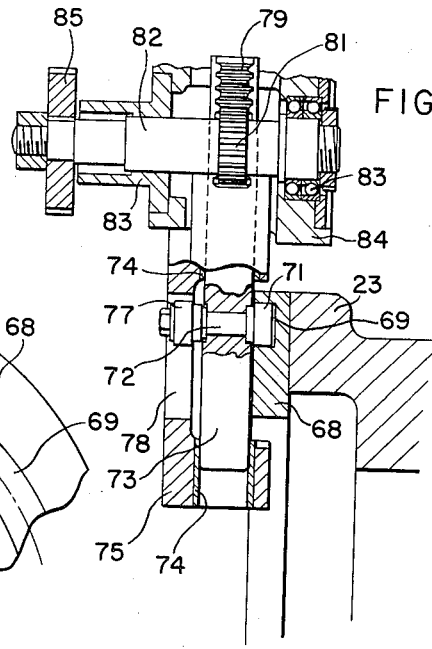
Fig. 4 is a sectional view in the plane indicated at 4—4 in Fig. 3.
Figure 3:
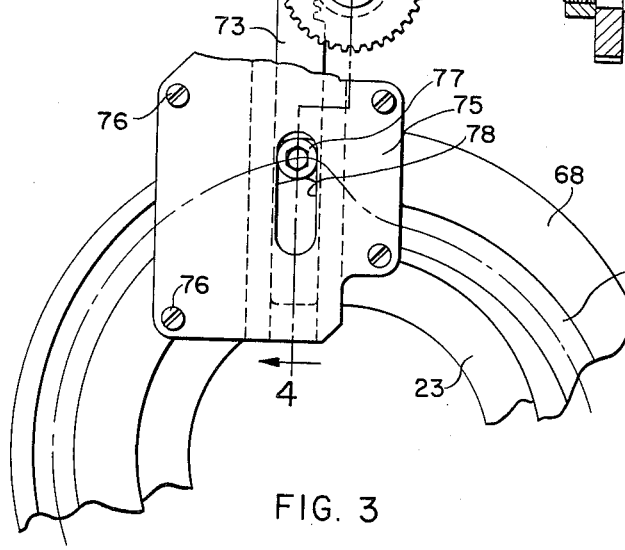
Fig. 3 is a detail end elevational view showing the ratio-varying cam and parts driven by it.

According to the present invention a cam ring 68 (Figs. 3 and 4) is secured to one end of drum cam 23, to rotate in unison therewith. Engaged in a continuous cam track 69 in the face of this ring is a follower roller 71 mounted on a pin 72 carried by a rod 73. The latter is guided for reciprocation in sleeve bearings 74 supported by a bracket 75 that is secured to the frame of the machine by fasteners 76. Another roller 77 on the pin 72 is engaged in a straight guide slot 78 in the bracket, to hold the rod against rotation in its bearings. On the rod are rack teeth 79 meshing with a pinion 81 affixed to a shaft 82 that is journaled in suitable bearings 83 that are mounted on a part 84 of the frame. A change gear 85 is secured to the outer end of this shaft, and, as shown in Fig. 2, acts through change gears 86, 87 and 88 to drive a shaft 89 upon which a clutch member 91 is splined. This member may be shifted on the shaft, by means of a handle 92, into engagement with clutch portions of one or the other of bevel gears 93 and 94. When disengaged from member 91 the gear 93 is freely rotatable on shaft 89, while gear 94 is affixed for rotation with a bevel pinion 95. Gears 93 and 94 both mesh with a pinion 96, the arrangement being such that when the clutch member is engaged with gear 94 the latter and pinion 95 rotate as a unit with shaft 89 and that when the clutch member is engaged with gear 93 the gear 94 and pinion 95 rotate oppositely from shaft 93. Bevel pinion 95 meshes with a bevel gear 97 that is rotatably mounted on shaft 41 and carries the spider 98 on which is supported the planet gear 43 of the differential mechanism 42, 43, 44.

It will be understood from the foregoing description that during operation of the machine the cutter 14 is rotated continuously as are also the cams 23 and 68. Cam 23, through its track 29, effects alternate rotation in opposite directions of main shaft 37 of the generating gear train which connects and drive cradle 13 and work spindle 12. If the shaft 62 and spider 98 remained stationary the cradle and work spindle would turn in both directions at a constant velocity ratio with respect to each other. However, as previously pointed out, the effect of the index device 63 is to rotate the shaft 62, to thereby act through differential gears 48, 49 and 51 to rotate the work spindle relative to the cradle, after each complete turn of cam 23, thereby bringing successive tooth spaces of the work gear G into cutting position. The effect of the cam 68 is to turn spider 98 during the cutting operation to thereby introduce motion to the generating train through differential 42, 43, 44, the motion thus introduced causing the cradle and work spindle to rotate in a different ratio in one direction than in the opposite direction.

Figure 5:
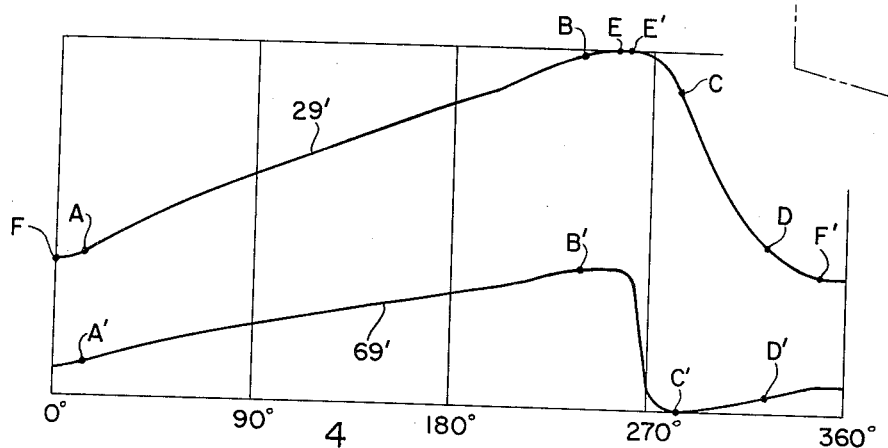
Fig. 5 is a diagram showing the phase relationship between the tracks of the generating train drive cam and the ratio-varying cam.

In Fig. 5 the horizontal extent of lines 29' and 69' represents the angular motion of cams 23 and 68 respectively, while the vertical extents of these lines represent the components of angular motion which their respective cam tracks 29 and 69 impart to the shaft 45. Either side of the teeth of gear G may be cut first, and the effect of cam 68 may be reversed by shifting the clutch 91. However, for the purpose of the following description it will be assumed that the machine is set up so that the convex side of the teeth is cut first, on rotation of the cradle and work spindle in one direction, and that the concave side of the teeth is cut during the return rotation. The rotation of shaft 37 in the first direction is accomplished by the rotation of cam 23 through the angle represented by the horizontal distance between points F and E, cutting of the convex side taking place between the points A and B. Cam track 29 is at dwell between points E and E' and also between F' and F. Between E' and F' reverse rotation of shaft 37 is effected, with the concave side being cut between points C and D. While cam 23 rotates between A and B, cam 68 rotates through the same angle, represented by the horizontal distance between points A' and B'. The component of motion applied to shaft 45 by cam track 29 during cutting of the convex side is represented by the vertical distance between points A and B. The effect of the cam track 69 is to apply through differential 42, 43, 44 to the shaft 45 another component of motion in the same direction, represented by the vertical distance between points A' and B'. Hence the net rotation of the shaft is represented by the vertical distance between A and B plus the vertical distance between points A' and B'. During the return rotation, while the concave tooth side is being cut, the net rotation of the shaft is represented by the vertical distance between points C and D minus the vertical distance between points C' and D'. Hence the rotation of the work gear G in which a concave tooth side is cut is through a smaller angle than the return rotation, when a convex tooth side is cut, while the angle of rotation of the cradle is the same for both directions.

Figure 6:
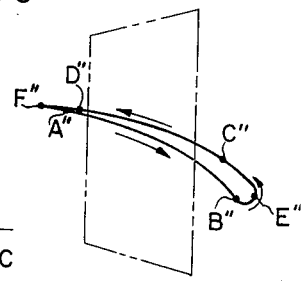
Fig. 6 is a diagram illustrating the path of the generating motion of the cutter relative to the tapered work gear.

The motion of the work gear is, of course, a motion relative to the cutter, and if the motion is pictured as being applied entirely to the cutter, the path of the latter becomes substantially as shown in the schematic diagram Fig. 6. In this diagram the solid line represents the path of the cutter relative to the work gear while it generates the sides of a tooth space. The part of this line between points A" and B" represents the path of the cutter in generating the convex side of the tooth space (while the cam 23 moves between points A and B), and the part between points C" and D" represents the path during generation of the opposite or concave side of the tooth space (while the cam 23 moves between points C and D).

During the reversal of the motion produced by cam track 29 between points D and A (through points F' and F), while the cutter path in Fig. 6 is from D" to F" and from F" to A", the indexing action of device 63 takes place. At this time the work support of the machine is automatically retracted, as is customary in machines of this kind, by cam operated mechanism, which in this case may be operated by one of the tracks 99 in cam 23.

During the reversal of the motion caused by cam track 29 between points B and C (Fig. 5), the cam track 69 produces the rapid motion represented by the path between points B' and C'. This is the rapid set-over of the pinion, indicated in Fig. 6 by the path B", E", C". It will be noted that the cam track 29 is so shaped that while the vertical distances F—E and E'—F' in Fig. 5 are equal, the horizontal distance A—B is much greater than horizontal distance C—D. In other words the rotations of the cradle and work spindle during cutting of the first side of a tooth space are made much slower than during the cutting of the opposite side, this being done to equalize the load on the cutter, which, of course, must remove a greater amount of stock during the first cut.

It will be understood that while the particular shape of the cam track 29 between points A and B and between points C and D does not affect the tooth profile curvature or the longitudinal tooth curvature, because both the cradle and the work spindle are proportionately affected, a definite relationship must be preserved between the shape of the cam tracks 29 and 69. If the cam track imparts a non-uniform component motion to the work spindle during the periods of cutting, then the same pattern of non-uniformity must exist in the component of motion to the work spindle during these same periods. Otherwise the same ratio of work spindle rotation to cradle rotation will not be preserved throughout each cutting period. In other words the curves 69' and 29' should be of the same shape, except for scale, between the respective points A to B and A' to B', and also between the respective points C to D and C' to D'. It is not essential however that the same scale be employed for both the curve, A' to B' and the curve C' to D'.

When generating gears of different pitch angle, tooth number and spiral angle it is of course necessary to provide different amounts of rotation of the cradle and work spindle. This may be accomplished by substituting change gears 36 of different ratio. The effect of cam 68 may also be increased or decreased by substituting change gears 85, 86, 87 and 88 of different ratio. By the latter substitution tooth spaces of the desired taper may be produced. The machine can be employed for cutting either spiral bevel, skew bevel or hypoid gears, provided the teeth are non-radial, i. e. provided the teeth extend at an angle to a plane axial of the gear.

It will be understood that the machine structure and mode of operation illustrated and described herein are to illustrate only the preferred embodiment of the inventive principles involved, and that these principles may be embodied in various other forms and arrangements without departing from the spirit of my invention or from the scope of the appended claims.

I claim as my invention:

1. A machine for generating tapered gears having non-radial teeth, comprising a work support, a tool support, a work spindle journaled in the work support, a rotatable cradle on which one of said supports is mounted, a generating train connecting the work spindle and the cradle for rotation, a motor drive and a reversing mechanism operated by the motor drive connected to said train for driving it alternately in opposite directions, a differential mechanism in said train at a point between the connection of the reversing mechanism and the work spindle, and means operated by the motor for introducing motion into said train through said differential mechanism for causing the work spindle to operate at a different ratio to the motor drive in one direction than in the opposite direction.

2. A machine for generating gears having non-radial teeth, comprising a work support, a tool support, a work spindle journaled in the work support, a rotatable cradle on which one of said supports is mounted, a generating train connecting the work spindle and the cradle for rotation, a cam and means to rotate it always in one direction, means actuated alternately in opposite directions by said cam and connected to said train for driving the latter, a second cam arranged to rotate in unison with the first mentioned cam, a differential mechanism in said train, and means operated by the second cam for introducing motion into said generating train through said differential mechanism for causing the work spindle and the cradle to rotate at a different ratio in one direction than in the opposite direction.

3. A machine for generating tapered gears having non-radial teeth, comprising a work support, a tool support, a work spindle journaled in the work support, a rotatable cradle on which one of said supports is mounted, a generating train connecting the work spindle and the cradle for rotation, a first cam and means to rotate it always in one direction, means actuated alternately in opposite directions by said cam and connected to said train for driving the latter, a second cam arranged to rotate in unison with the first cam, and means operated by the second cam for introducing other motion into said generating train for causing the means actuated by the first cam and the work spindle to operate at a different ratio in one direction than in the opposite direction, said means operated by the second cam being connected to the generating train by a differential mechanism located in the generating train at a point between the work spindle and the point of connection of said means actuated by the first cam.

4. A machine for generating tapered gears having non-radial teeth, comprising a work support, a tool support, a work spindle journaled in the work support, a rotatable cradle on which one of said supports is mounted, a generating train connecting the work spindle and the cradle for rotation, means connected to said generating train for rotating it alternately in opposite directions, a cam arranged to rotate unidirectionally in timed relation to the operation of said means, a differential mechanism in said train, means operated by said cam for introducing motion into said generating train through said differential mechanism for causing the work spindle and the cradle to rotate at a different ratio in one direction than in the opposite direction, and the last-mentioned means being connected to said differential mechanism through change gears, whereby the taper of tooth spaces generated by the machine may be varied by substituting change gears of different ratio.

5. A machine for generating tapered gears having non-radial teeth, comprising a work support, a tool support, a work spindle journaled in the work support, a rotatable cradle on which one of said supports is mounted, a generating train connecting the work spindle and the cradle for rotation, means connected to said train for driving it alternately in opposite directions, a cam arranged to rotate unidirectionally in timed relation to operation of said means, a differential mechanism in the generating train, means operated by the cam and connected to said differential mechanism for introducing motion into said generating train for causing the work spindle and the cradle to rotate at a different ratio in one direction than in the opposite direction, and reversing means provided between the differential mechanism and the means operated by the cam, whereby gears of either hand of spiral may be generated on the machine.

6. A machine for generating tapered gears having non-radial teeth, comprising a work support, a tool support, a work spindle journaled in the work support, a rotatable cradle on which one of said supports is mounted, a generating train connecting the work spindle and the cradle for rotation, a unidirectionally rotatable cam and means actuated thereby alternately in opposite directions, said means being connected to said generating train for driving the latter, a second cam arranged to rotate unidirectionally in unison with the first-mentioned cam, a differential mechanism in said generating train between the work spindle and the connection of the means actuated by the first-mentioned cam, means operated by the second cam and connected to the differential for introducing into the generating train motion to cause the means actuated by the first-mentioned cam and the work spindle to operate at a different ratio in one direction than in the opposite direction, the last-mentioned means being connected to said differential through change gears whereby the taper of tooth spaces generated by the machine may be varied by substituting change gears of different ratio, and reversing means provided between the differential and said means operated by the second cam whereby gears of either hand of spiral may be generated on the machine.

7. A machine of the intermittent indexing type for generating gears having non-radial teeth and tapered tooth spaces, comprising: a work support; a support for a circular cutter; a work spindle journaled in the work support; a rotatable cradle on which one of said supports is mounted; a generating gear train connecting the work spindle and the cradle for rotation; means connected to said generating train for rotating it alternately in opposite directions; a differential mechanism in said generating train between the work spindle and the connection with said means, a unidirectionally rotatable cam, means operated by the cam and connected to the differential mechanism to introduce other motion into said generating train, said cam being so formed that the cutter will generate one side of a tapered tooth space during the rotation of the train in one direction and will generate the opposite side of a tooth space during the return rotation, that the work spindle will rotate to set over between the two generating operations when the cutter is adjacent the large end of a tapered tooth space, and that there will be a dwell in said other motion when the cutter is adjacent the small end of a tapered tooth space; and means for introducing a work spindle indexing motion into the train during said dwell.

References Cited in the file of this patent

UNITED STATES PATENTS

| | | |
|---|---|---|
| 2,302,004 | Carlsen | Nov. 17, 1942 |
| 2,634,657 | Aschwanden | Apr. 14, 1953 |